Figure 1:
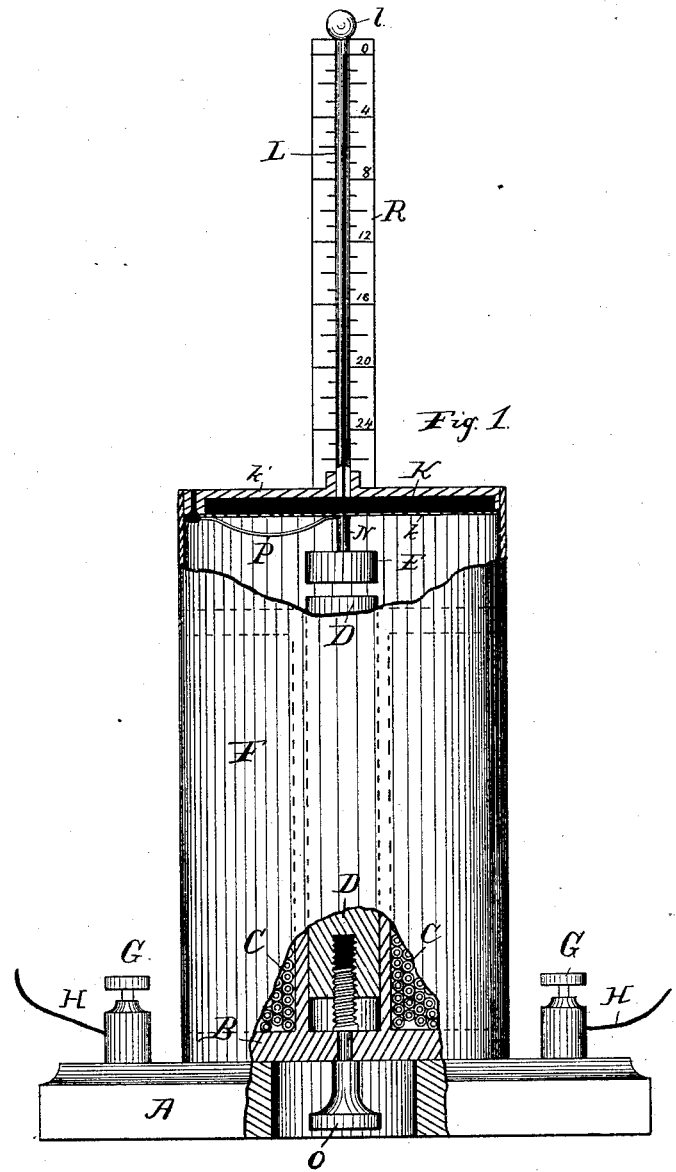

(No Model.)  2 Sheets—Sheet 1.

E. H. AMET.
ELECTRIC CURRENT INDICATOR.

No. 340,538.  Patented Apr. 27, 1886.

Witnesses:  Inventor:
Lew. E. Curtis  Edward H. Amet
H. M. Munday.  By Munday Evarts & Adcock
 his Attorneys.

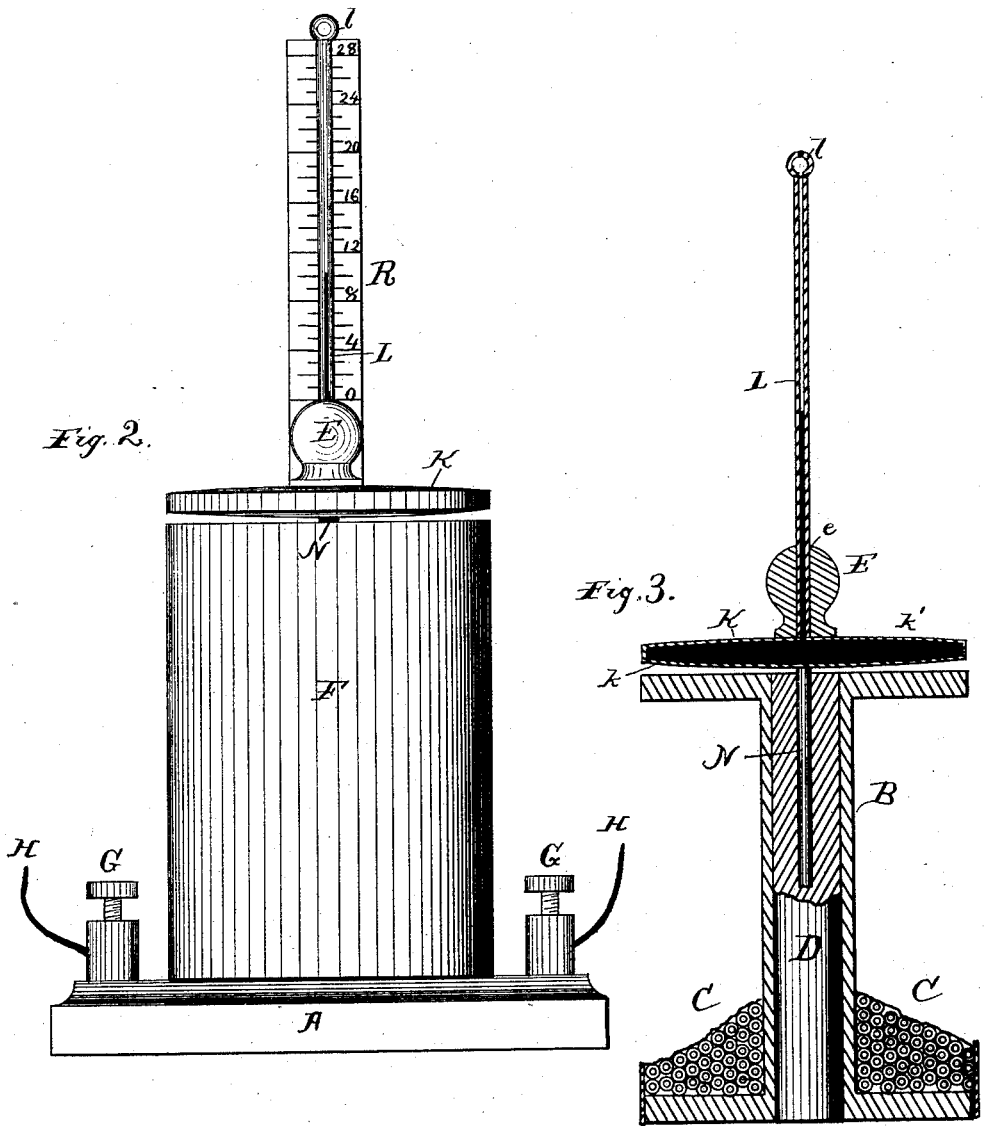

UNITED STATES PATENT OFFICE.

EDWARD H. AMET, OF CHICAGO, ILLINOIS, ASSIGNOR TO HIMSELF AND H. A. STREETER, OF SAME PLACE.

ELECTRIC-CURRENT INDICATOR.

SPECIFICATION forming part of Letters Patent No. 340,538, dated April 27, 1886.

Application filed January 28, 1886. Serial No. 190,048. (No model.)

*To all whom it may concern:*

Be it known that I, EDWARD H. AMET, a citizen of the United States, residing in Chicago, in the county of Cook and State of Illinois, have invented a new and useful Improvement in Electric-Current Indicators, of which the following is a specification.

The object of my invention is to provide an efficient and reliable electric-current indicator or meter of a simple and durable construction, for use upon dynamo-machines or other circuits, and by means of which the operator or attendant can see at a glance the amount of current; and to this end my invention consists of an electro-magnet the coil of which is connected with the circuit the current in which is to be measured, in combination with a collapsible closed vessel of large area provided with an indicating-tube of small diameter, and the movable armature of the magnet, which operates to compress or bulge out the vessel and force the liquid therein to a greater or less height, according to the strength of the magnet and amount of current flowing through it. A graduated scale attached to the indicating-tube will show the strength of the current in ampères or volts, or fractions thereof. When the device is used to measure ampères, the magnet is wound with coarse wire and included directly in the circuit to be measured. When used to measure volts, the magnet is wound with fine wire and placed in a shunt or derived circuit.

The sensitiveness of my improved meter may be increased or decreased by simply increasing or decreasing the area of the liquid-containing vessel as compared with that of the bore of the indicating-tube. The liquid used should preferably be colored, so that its height in the indicating-tube may be readily perceptible. The compressible vessel may preferably be cylindrical in form, the heads or ends of the same, one or both, consisting of thin flexible diaphragms—such as thin sheet copper or brass, for example—so as to be readily bulged out or compressed by the armature of the magnet. The vessel may rest directly upon the core or spool of the magnet, while the soft-iron armature of the magnet may be placed or rest directly upon the compressible vessel. The armature may be soldered or otherwise secured rigidly to the upper diaphragm of the vessel, and be provided with a central hole, through which the indicating-tube may project; but that which I deem to be the best form of practicing my invention is to support the collapsible vessel slightly above the magnet and attach the soft-iron armature to the lower thin flexible diaphragm of the vessel, or suspend it therefrom, the upper head or diaphragm being preferably made stiff and rigid. In this case the attraction of the magnet will tend to increase the capacity of the vessel and cause the colored liquid in the indicating-tube to descend instead of rise. A spring serves to compress the diaphragm, while the magnet resists the action of the spring. The mechanism may be readily adjusted by adjusting the position of the core in relation to its armature. To prevent the liquid from being forced out at the open end of the indicating-tube by any sudden and violent fluctuation of the current—as, for example, when the circuit is first closed or opened—I provide the indicating-tube with a hollow bulb to contain any excess of liquid which may be forced up. This bulb has a fine opening to admit air and preserve the balance of atmospheric pressure inside and outside the compressible vessel. In this way a reliable, durable, and efficient current-indicator may be made very cheaply and of any desired degree of sensitiveness for use upon electric-light and other circuits. The indicating-tube should be open at its upper end.

In the accompanying drawings, which form a part of this specification, and in which similar letters of reference indicate like parts, Figure 1 is a central sectional elevation of a device embodying my invention, and Figs. 2 and 3 are respectively a side elevation and sectional view showing a slight modification.

In said drawings, A represents the base-block, upon which the magnet and apparatus may be mounted.

B is the spool of the magnet; C, the helix or coil; D, its core; E, its armature; F, its inclosing-case, and G G the binding-posts by which the coil C is connected in the circuit H. The circuit H may be the direct circuit, the current on which is to be measured, or a shunt-circuit, according as the device is used as an ammeter or a volt-meter; and the coil C is of coarse or fine wire, according as it is included in the direct circuit or a shunt.

K is a compressible vessel, preferably of cylindrical shape, having heads or ends $k$ $k'$, one or both consisting of thin flexible diaphragms; but preferably, however, only the lower one should be of flexible material, while the other should be rigid. These diaphragms may be made of thin sheet brass or copper, or other suitable material, and the distance between the two diaphragms should be comparatively slight, so that, if desired, as shown in Figs. 2 and 3, the compressible vessel may be inserted or placed directly between the armature E and the core or spool of the magnet, without removing the armature too far from the core. The armature E is preferably attached to or suspended from the thin diaphragm or head $k$ by a pin, N, which may be soldered to said diaphragm at one end and to the armature at the other, or attached in any other suitable manner. A flat or other spring, P, attached to the rim of the vessel K serves to compress the flexible diaphragm $k$, and hold the liquid at the zero-point at the top of the indicating-tube, except when a current is flowing through the coil C of the magnet, and thus causes the core D to attract the armature E, and thus slightly pull down the diaphragm $k$ and increase the capacity of the vessel.

O is a screw for adjusting the device by regulating the positions of the core D to the armature E. By this means any intermediate or connecting mechanism is rendered unnecessary, in order to communicate the force or motion of the armature to the compressible vessel or its flexible diaphragm; and by this means, also, the cost of making the apparatus is very materially diminished, and any inaccuracy due to friction or lost motion is obviated.

L is the indicating-tube, made of glass or transparent material, secured to and communicating with the vessel K. As the area of the vessel K is very great as compared with that of the bore of the indicating-tube L, a very slight movement of the armature will cause a perceptible descent or rise of the liquid in the tube L. The upper end of the tube L should be open, but provided with an enlarged hollow bulb, $l$, to receive any excess of liquid which might otherwise be forced out.

In the modification shown in Figs. 2 and 3 the armature E has a central hole, $e$, through which the indicating-tube projects. The guide-pin N should in this case fit in a hole in the core D, and thus serve to keep the vessel and its indicating-tube securely in place. In this modification the zero-point is of course near the bottom of the indicating-tube.

R is a graduated scale attached to the indicating-tube L, to show the number of ampères or volts, or fractions thereof, according to the height of the tube L.

Where the instrument is to be used on an ordinary electric-light circuit for the purpose of simply indicating at a glance whether the current is steady or not, the scale R may be graduated in equal divisions, as indicated in the drawings. Where the instrument is used to measure ampères or volts, the graduations upon the scale R should be determined by comparison with a standard instrument, and the different points on the scale indicating the several numbers of ampères or volts thus determined by actual tests.

With the instrument as I have in actual practice ordinarily constructed it, the movement of the armature E is very slight, the whole limit of such movement being from one sixty-fourth to one thirty-second of an inch, so that the variation in the force of the magnet due to the change in the distance between the magnet E and the core D is not very great. This change in force of the magnet is also somewhat affected or counteracted by the variation in the resistance of the flexible diaphragm as it is moved in or out by the armature E, and also by the variation in the hydrostatic pressure of the liquid due to the change in height of the column in the tube L. Owing to these causes, I have found in practice that when the scale R is graduated to indicate volts or ampères the graduations will be almost equally distributed apart, and for convenience they are thus shown in the drawings. However, for the instrument to be exact, the positions of the graduations upon the scale should always be determined by actual tests, just as the boiling and freezing points of a thermometer-scale are ordinarily determined.

It will be understood that my invention is not confined to the use of an electro-magnet having a fixed core and a separate armature, as electro-magnets or solenoids having movable cores may also be used.

I claim—

1. An electric-current indicator consisting in the combination of an electro-magnet, a collapsible or compressible vessel containing a liquid, and an indicating-tube connected therewith, substantially as specified.

2. The combination, with an electro-magnet and its movable armature, of a compressible vessel having a flexible diaphragm or head connected directly with said armature, and an indicating-tube connected with said vessel, substantially as specified.

3. The combination, with an electro-magnet and its movable armature, of a compressible vessel, an indicating-tube connected with said vessel, and a graduated scale attached to said tube, substantially as specified.

4. An electric-current indicator consisting in the combination of an electro-magnet, a collapsible or compressible vessel containing a liquid, and an indicating-tube connected therewith, having a hollow open bulb, $l$, at its upper end, substantially as specified.

5. An electric-current indicator consisting in the combination of an electro-magnet, a collapsible or compressible vessel containing a liquid, and an indicating-tube connected therewith, and a set-screw for adjusting the relative position of the core and armature of said magnet, substantially as specified.

6. The combination, with an electro-magnet and its movable armature, of a compressible vessel, K, having a thin flexible sheet-metal head or diaphragm, $k$, of large area connected directly with said armature, and an indicating-tube of small bore connected therewith, having an enlarged hollow bulb, $l$, at its upper end, substantially as specified.

EDWARD H. AMET.

Witnesses:
H. M. MUNDAY,
LEW. E. CURTIS.